United States Patent [19]
Bates et al.

[11] 3,873,295
[45] Mar. 25, 1975

[54] QUENCH APPARATUS FOR GLASS TEMPERING

[75] Inventors: William G. Bates, Sellersville; William E. Marceau, Horsham, both of Pa.

[73] Assignee: Selas Corporation of America, Dresher, Pa.

[22] Filed: Feb. 5, 1974

[21] Appl. No.: 439,729

[52] U.S. Cl. .................................. 65/351, 65/114
[51] Int. Cl. ........................................... C03b 27/00
[58] Field of Search ............ 65/104, 114, 348, 349, 65/350, 351

[56] References Cited
UNITED STATES PATENTS

| | | | |
|---|---|---|---|
| 3,372,016 | 3/1968 | Rahrig et al. | 65/114 |
| 3,457,057 | 7/1969 | Gardon | 65/114 |
| 3,476,542 | 11/1969 | Ritter, Jr. | 65/351 X |
| 3,481,724 | 12/1969 | Starr et al. | 65/114 X |

*Primary Examiner*—Arthur D. Kellogg

[57] ABSTRACT

A quench for use in tempering glass comprising a plurality of elongated, narrow air chambers provided on one surface with a multiplicity of small passages through which jets of cooling air are discharged. The chambers are so arranged that the jets are directed against opposite sides of a sheet of glass moved between them. A conveyor comprising a large number of narrow rollers is provided to move the glass through the quench.

4 Claims, 3 Drawing Figures

QUENCH APPARATUS FOR GLASS TEMPERING

BACKGROUND AND SUMMARY OF THE INVENTION

The present invention relates to glass tempering, and more particularly to a quench for rapidly cooling the heated glass to temper it.

As is well known, glass is tempered by heating it evenly to about its deformation temperature and rapidly quenching it. The uniformity of the stresses placed in a sheet of glass during the tempering process is dependent in large part upon the uniformity of the pattern of the quenching jets directed against the glass. Much study has been given to this problem and the prior art discloses many ways of directing the jets against the glass.

The present invention discloses apparatus for quenching sheet glass in such a manner that there is a minimum of distortion and a uniform break pattern in the resulting fragments. There is provided a plurality of parallel air chambers, each of which is provided with a plurality of small jet orifices through which air is discharged against the glass sheet. Sets of air chambers are located above and below the path of the glass and are so spaced and the jets are so directed that the jets impinge upon the glass sheet in a "random" pattern as it moves past them. The glass is supported upon and moved by a plurality of narrow wheels that are located between the lower set of air chambers. The apparatus is shown with the glass traveling in a horizontal position, as is usual when thin glass sheets are being tempered. It will be apparent, however, that the chambers can be so arranged that the glass is in a vertical position.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

IN THE DRAWINGS

DETAILED DESCRIPTION

Figure 1:
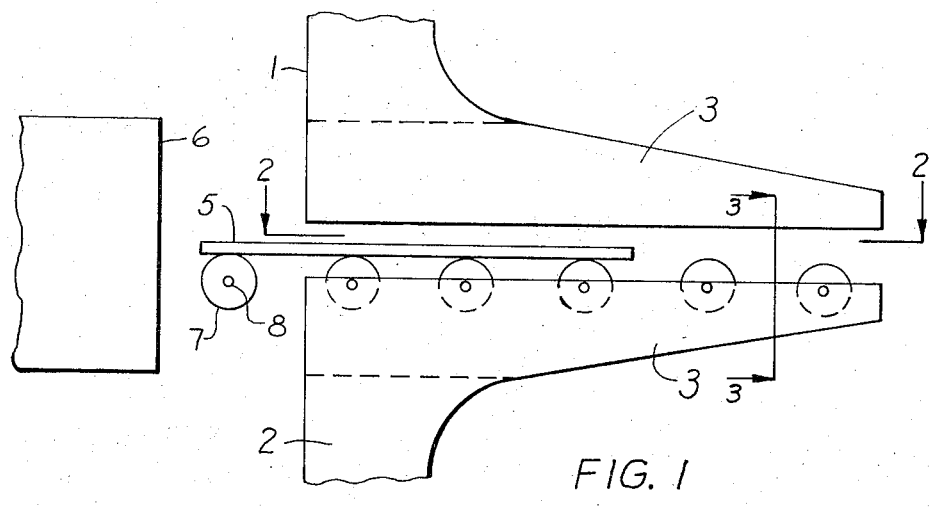
FIG. 1 is a side view of the quench.

Referring to the drawing, there is shown an upper intake 1 and a lower intake 2 that are preferably supplied with air under pressure from the same blower (not shown). Each intake is connected to and supplies a plurality of elongated and separate air chambers 3. The chambers reduce in depth as they extend away from the intakes as shown. The chambers are spaced apart a distance substantially equal to their width and enough chambers are provided so that they cover a width equal to that of the largest sheet of glass to be treated. The length of the cooling path between the sets of chambers will be sufficient to cool the glass being treated, and this will vary depending upon the thickness of the glass sheet, its temperature, and the speed with which the glass is traveling.

Figure 3:
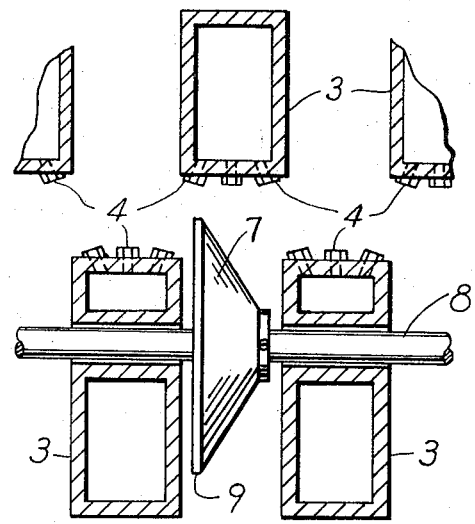
FIG. 3 is a view taken on line 3—3 of FIG. 1.

The top, elongated, narrow surfaces of the lower chambers 3 and the corresponding lower surfaces of the upper chambers which face the glass are preferably about ¾ inch wide and are provided with a plurality of bosses 4 as shown in FIG. 3, with each boss having a hole drilled through it perpendicularly to its outer surface. The surfaces are at different angles so that the jets of air flowing through them will impinge on the surface of the glass between the chambers as well as in front of them.

The average pattern of the impingement points, where the air jets hit the glass, are chosen to be on approximately ½ inch centers with the jets ⅛ inch in diameter. It is desirable to have the impingement pattern "randomized" with respect to the glass travel in order to minimize repetition of the impingement pattern of the jets as seen by any spots on the glass as it moves through the quench. Thus, some of the jets are perpendicular to the chamber wall while others are at various angles up to 40°. The thickness of the chamber wall at the bosses should be at least two hole diameters in order to impart to the air jet the direction of the hole.

The use of many small holes closely spaced produces a higher heat transfer efficiency than can be achieved with larger holes on larger centers. The use of the large number of small holes means that no one hole or jet contributes a large portion of the quenching action. Therefore, normal manufacturing tolerances on hole size and spacing will not cause a significant change in heat transfer to a "strip" of glass as it passes any particular position in the quench. Also, there is less chance of mechanical distortion of the soft glass by high velocity jets of air. It is noted that the reduction in size of the chambers 3 toward their outer ends is such that the pressure of the air jets discharged from the chambers will be the same from end to end.

Sheets of heated glass 5 are moved from a furnace 6 between the sets of opposed air chambers 3. To this end, a conveyor is provided comprising a plurality of rollers 7 that are mounted on shafts 8 driven at a constant speed by some conventional means, not shown. As may best be seen in FIG. 3, the shafts 8 pass through openings provided in the lower air chambers 3 and the conveyor rollers 7 are of a diameter such that the glass sheets are supported above the chambers, a distance equal to four or five diameters of the holes in bosses 4. Similarly, the lower faces of the upper chambers are about the same distance above the surface of a glass sheet being treated.

Figure 2:
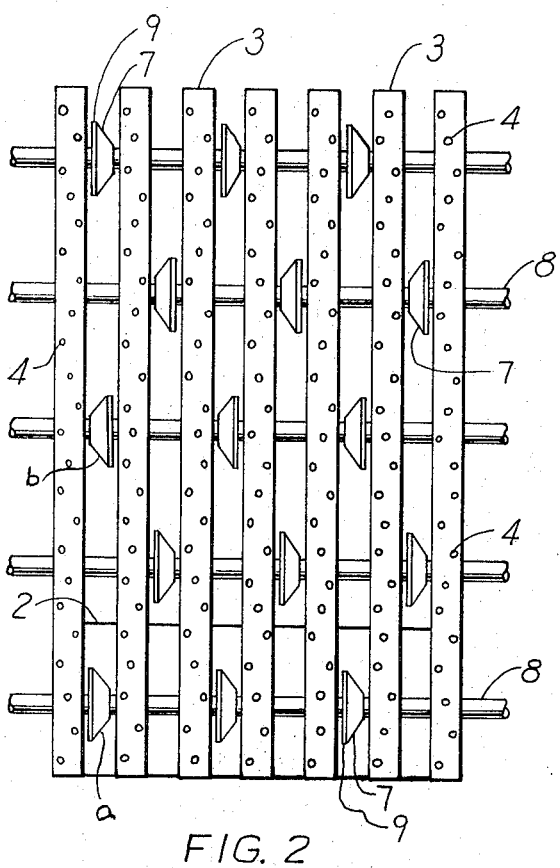
FIG. 2 is a view on line 2—2 of FIG. 1, showing the top of the bottom quench head.

Each roller 7 is substantially cone-shaped so that its periphery 9 is at a greater distance from one radial face than from the other. In assembling the conveyor, a roller 7 is attached to a shaft 8 between every other air chamber with the rollers on adjacent shafts alternating between chambers as shown in FIG. 2. Also, as shown in that FIG., the rollers between the same pairs of air chambers are reversely mounted so that the periphery 9 of one roller $a$, is adjacent to one air chamber while the next roller $b$, between these chambers, has its periphery adjacent to the other chamber. In this manner the strips on the glass sheet that contact the rollers, encounter a roller every fourth shaft. In addition, it is noted that the narrow periphery of the rollers at the point of contact with the glass will minimize interference with the jets of air and the resulting heat transfer. The use of many narrow rollers to support the glass has the advantage of providing a good support without blocking the air jets at any time on any significant portion of the glass.

In operation, glass sheets are moved from the furnace 6 by rollers 7 at a constant speed immediately into the quench between the large number of small jets. The narrow chambers provide sufficient space between them to allow adequate escape area for the jets after they have struck the glass. The jets are able to reach out to engage the glass between the air chambers so that there is no appreciable loss in heat transfer efficiency at any point in the glass.

The results of the conveyor construction and air jet design are a substantially constant heat transfer rate from the glass at high efficiency and with a minimum of mechanical distortion of the glass. It has also been found that the power required for blowers is reduced substantially compared to more conventional quench arrangement.

While in accordance with the provisions of the Statutes we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. A quench for use in tempering glass plates moving in a given direction comprising means forming a plurality of chambers, each being provided with an elongated, narrow surface extending in said direction, said surfaces being provided with a plurality of jet orifices directed at various angles to said surfaces, means to mount some of said chambers with said elongated surfaces side by side and separated by a distance substantially equal to the width of the narrow portion of said surfaces with said surfaces horizontal and facing upwardly, means to mount others of said chambers in a similar fashion with said surfaces thereof horizontal and facing downwardly, the space between the upwardly and downwardly facing surfaces forming a passage through which glass sheets are moved, conveyor means including rollers having axes transverse to glass movement mounted between some of said upwardly facing surfaces to move the glass, and means to supply air under pressure to said chambers to be discharged as jets through said orifices against the glass.

2. The quench of claim 1 in which the upwardly facing surfaces being offset with respect to the downwardly facing surfaces.

3. The quench of claim 1 in which the angles of said jet orifices with respect to the surfaces in which they are located are such that jets will be directed against glass in front of said surfaces and glass in front of the space between said surfaces.

4. The quench of claim 1 in which said rollers are substantially conical in shape with adjacent rollers in the direction of movement of glass through said path having their bases reversed.

* * * * *